Sept. 8, 1925.
G. J. SCHAFFER
1,553,050
FIRE PREVENTING DEVICE FOR MOTION PICTURE PROJECTING MACHINES
Filed Sept. 15, 1921
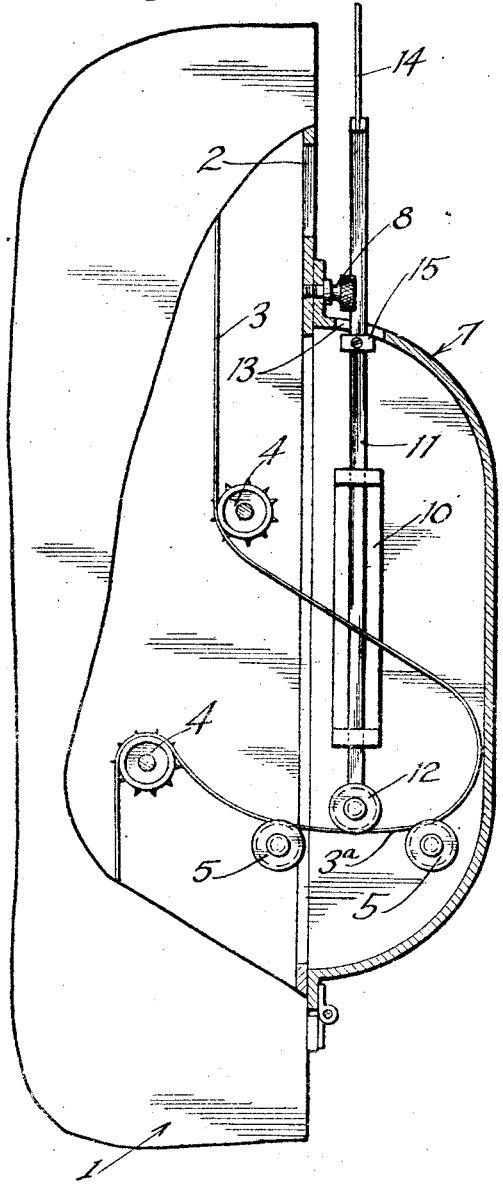
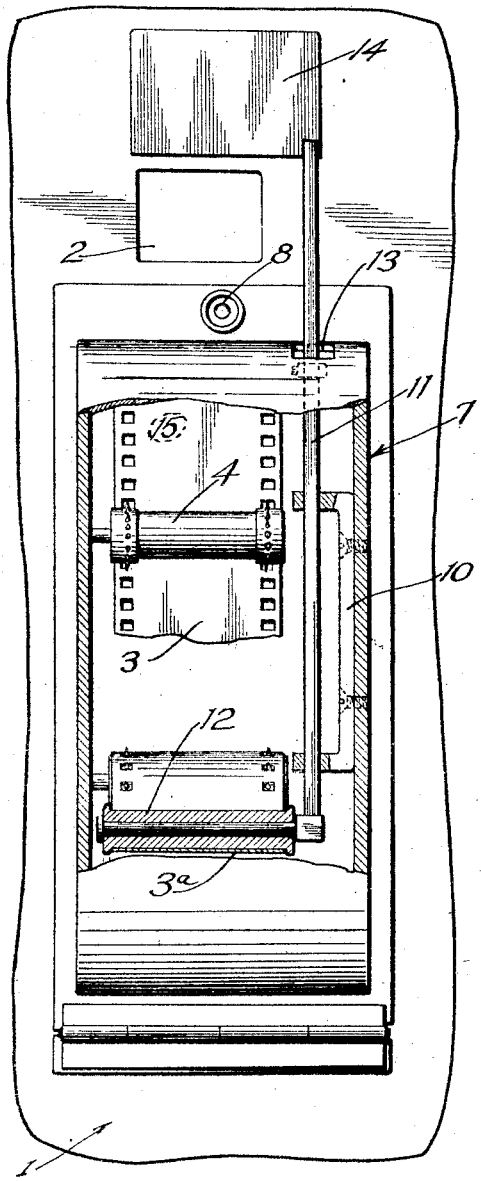
Inventor:
GEORGE J SCHAFFER.
BY Herman Miller.
Attorney.

Patented Sept. 8, 1925.

1,553,050

UNITED STATES PATENT OFFICE.

GEORGE J. SCHAFFER, OF LOS ANGELES, CALIFORNIA.

FIRE-PREVENTING DEVICE FOR MOTION-PICTURE-PROJECTING MACHINES.

Application filed September 15, 1921. Serial No. 500,897.

*To all whom it may concern:*

Be it known that I, GEORGE J. SCHAFFER, a citizen of the United States, residing at Los Angeles, in the county of Los Angeles and State of California, have invented new and useful Improvements in Fire-Preventing Devices for Motion-Picture-Projecting Machines, of which the following is a specification.

My invention relates to screen mechanism employed in connection with the exposure opening of a motion picture projecting apparatus, for closing the opening when the film strip breaks, thereby cutting off the beam of light passing through the opening so as to prevent burning of the film. In screen mechanisms of this character heretofore proposed, they are so associated with the film strip as to close the exposure opening with insufficient rapidity to actually prevent burning of the film strip, particularly when employing lamps of high candle power as is now the common practice.

It is a purpose of my invention to provide a screen mechanism which is associated with any portion of the loop of a film strip or that portion between the intermittent feed sprocket and the lower take-up sprocket, so that when the film strip breaks the screen mechanism will be immediately released to close the exposure opening with the required rapidity to prevent the possibility of the film strip being ignited.

The invention will be readily understood from the following description of the accompanying drawings, in which:

Figure 1 is a side elevation of a device constructed in accordance with the invention, partly broken away.

Fig. 2 is a front elevation of an apparatus, partly broken away.

In the drawings I have shown a usual casing 1 adapted to carry the movable film strip and having an exposure opening 2 alined with the film strip and arranged in usual manner to receive the rays of light of the projecting apparatus. The film strip 3 moves over the usual sprocket rollers 4 through casing 1, and is also arranged to pass over rollers 5 which are so positioned as to form a horizontal flight 3ª of the film strip. The casing is preferably provided with a usual hinged door 7 having retaining means 8 and preferably adapted to receive the horizontal flight of the film strip in the space formed by said door which is a concave structure.

A bracket 10 is arranged upon the inside of door 7 and carries a supporting rod 11 slidable through said bracket and having a roller 12 at its lower end which rests upon the horizontal flight of the film strip. The rod 11 extends upwardly beyond door 7 through a suitable opening 13 formed therein, and said supporting rod carries a screen 14 which is above exposure opening 2 when roller 12 rests upon the film strip so as to elevate the supporting rod.

The parts are so arranged that when the film breaks so as to release roller 12 and thereby permit dropping of the supporting rod, the screen will overlie the exposure opening and thereby eliminate the possibility of a fire. A collar 15 is adjustable along rod 11 and is arranged to impinge against bracket 10 when the supporting rod and screen are lowered, as thus described. The collar thus forms a stop for limiting the movement of the supporting rod in order to properly aline the screen and the exposure opening.

It will be seen that I have provided an extremely simple but efficient fire preventing means wherein a screen is automatically lowered to position covering the exposure opening of the casing of a projecting machine whenever a film, which is being exhibited, breaks.

Various changes may be made without departing from the spirit of the invention as claimed.

What is claimed is:

1. A motion picture projecting machine including a casing having an exposure opening, a door below said opening, a film strip movable through the casing and across said exposure opening, supporting elements for said film strip arranged to form a loop in the strip below the exposure opening, a vertically disposed U-shaped bracket secured within the door and having the parallel portions thereof formed with openings, a supporting rod slidable in said openings and resting upon the loop of the film strip, and a screen carried by said rod and normally positioned above the exposure opening, the breaking of said film strip collapsing the loop and thereby releasing said supporting rod to permit the screen to drop into closing position with respect to the exposure opening.

2. A device of the character described comprising a bracket, a rod slidably sustained in the bracket, a roller carried by the rod, a screen carried by the rod, and means for limiting the movement of the rod through the bracket.

3. In a motion picture projecting apparatus, an exposure opening adjacent which the film is adapted to pass, a loop continuously formed by the advancing film, a portion of said loop resting upon guide rollers so as to form a substantially horizontal bight supported by said rollers, a vertically slidable rod carrying a roller resting upon said bight adapted to fall upon breaking of said film, and a screen actuated by the falling of said rod for covering said exposure opening.

4. A device of the character described comprising a bracket, a rod slidably sustained in the bracket, a roller carried by the rod, a screen carried by the rod, and a collar adjustably secured to the rod for limiting the movement of the rod through the bracket.

5. A screen mechanism comprising a bracket, a rod slidable on the bracket, a screen carried by the upper end of the rod, a collar carried by the lower end of the rod and adapted to rest on the loop portion of a film strip disposed below the exposure opening of a motion picture projecting machine so as to normally hold the screen in nonclosing position with respect to the exposure opening.

6. In a motion picture projecting apparatus, an exposure opening adjacent which the film is adapted to pass, a loop continuously formed by the advancing film, the lower portion of said loop resting upon guide rollers so as to form a substantially horizontal bight supported by said rollers, a vertically slidable rod carrying a roller resting upon said bight adapted to fall upon breaking of said film, and a screen actuated by the falling of said rod for covering said exposure opening.

In testimony whereof I have signed my name to this specification.

GEO. J. SCHAFFER.